(12) United States Patent
Scharf et al.

(10) Patent No.: US 12,540,662 B2
(45) Date of Patent: Feb. 3, 2026

(54) GEAR ASSEMBLY FOR DRIVING A RAM OF A SQUARE BALER

(71) Applicant: Usines CLAAS France SAS, St. Rémy/Woippy (FR)

(72) Inventors: Thorsten Scharf, Mettlach (DE); Michael Schulte, Dellbrück (DE); Thierry Walter, Longeville-lès-Metz (FR); Emile Gaucher, Chevillon (FR)

(73) Assignee: Usines CLAAS France SAS, St. Rémy/Woippy (FR)

( * ) Notice: Subject to any disclaimer, the term of this patent is extended or adjusted under 35 U.S.C. 154(b) by 702 days.

(21) Appl. No.: 17/945,174

(22) Filed: Sep. 15, 2022

(65) Prior Publication Data

US 2023/0077734 A1 Mar. 16, 2023

(30) Foreign Application Priority Data

Sep. 15, 2021 (DE) ..................... 10 2021 123 867.6

(51) Int. Cl.
*F16H 37/12* (2006.01)
*A01F 15/08* (2006.01)
(Continued)

(52) U.S. Cl.
CPC ....... *F16H 37/124* (2013.01); *A01F 15/0841* (2013.01); *B30B 9/306* (2013.01);
(Continued)

(58) Field of Classification Search
CPC .. F16H 37/124; F16H 37/0833; F16H 37/042; F16H 37/04; F16H 3/663;
(Continued)

(56) References Cited

U.S. PATENT DOCUMENTS 4,615,238 A * 10/1986 Cheatum ............. A01F 15/0841
475/263
5,899,054 A 5/1999 Hawlas et al.
(Continued)

FOREIGN PATENT DOCUMENTS

DE     19621391 A1 * 12/1997 ........... A01D 69/005
DE     19628606 C2 * 8/2000 ......... A01F 15/0841
(Continued)

OTHER PUBLICATIONS

European Search Report for European patent application No. 22180925.4-1105 mailed Dec. 12, 2022.

*Primary Examiner* — Arpad Fabian-Kovacs
(74) *Attorney, Agent, or Firm* — Lempia Summerfield Katz LLC

(57) ABSTRACT

A gear assembly is disclosed for driving a ram arranged in a pressing channel of a square baler so as to be movable between end positions. The gear assembly comprises at least one side gear, which may be driven indirectly by a power take-off shaft of an agricultural production machine, and at least one reduction gear which is connected downstream from the at least one side gear and may be connected on the output side to a crankshaft on which the ram is mounted. The gear assembly further includes at least one flywheel that is connected between the at least one side gear and the at least one reduction gear, and at least one shiftable clutch device that is connected between the at least one flywheel and the at least one reduction gear.

20 Claims, 3 Drawing Sheets

(51) Int. Cl.
*B30B 9/30* (2006.01)
*B60K 6/387* (2007.10)
*F16D 25/00* (2006.01)
*A01F 15/04* (2006.01)
*B60K 6/48* (2007.10)
*B60K 6/547* (2007.10)
*F16H 3/00* (2006.01)
*F16H 3/46* (2006.01)
*F16H 3/66* (2006.01)
*F16H 37/04* (2006.01)
*F16H 37/08* (2006.01)

(52) U.S. Cl.
CPC .............. B60K 6/387 (2013.01); F16D 25/00 (2013.01); *A01F 15/042* (2013.01); *B60K 6/48* (2013.01); *B60K 6/547* (2013.01); *F16H 3/006* (2013.01); *F16H 3/46* (2013.01); *F16H 3/663* (2013.01); *F16H 37/04* (2013.01); *F16H 37/042* (2013.01); *F16H 37/0833* (2013.01)

(58) Field of Classification Search
CPC ........... F16H 3/46; F16H 3/006; B60K 6/547; B60K 6/48; B60K 6/387; B30B 9/306; A01F 15/0841; A01F 15/042
See application file for complete search history.

(56) References Cited

U.S. PATENT DOCUMENTS

| | | | | |
|---|---|---|---|---|
| 6,105,353 A * | 8/2000 | Mohr | ................... | A01D 69/005 475/2 |
| 8,113,078 B2 * | 2/2012 | Lang | ................... | A01F 15/0841 74/421 A |
| 9,814,185 B2 | 11/2017 | Arnould et al. | | |
| 10,980,184 B2 * | 4/2021 | Naeyaert | .............. | A01B 61/025 |
| 11,871,701 B2 * | 1/2024 | Bonte | ..................... | A01F 15/04 |
| 11,950,539 B2 * | 4/2024 | Demon | ...................... | F03G 3/08 |
| 2008/0081724 A1 * | 4/2008 | Ivantysynova | .......... | B60K 6/12 475/129 |
| 2008/0173495 A1 * | 7/2008 | Komatsu | ................ | B60K 17/22 180/344 |
| 2010/0170407 A1 * | 7/2010 | Vu | ........................ | B30B 9/3025 100/179 |
| 2010/0298081 A1 * | 11/2010 | Ivanysynova | ............ | B60K 6/12 475/72 |
| 2014/0158002 A1 * | 6/2014 | O'Reilly | .............. | A01F 15/0841 100/188 R |
| 2014/0165859 A1 * | 6/2014 | O'Reilly | .............. | A01F 15/0841 100/179 |
| 2016/0081258 A1 | 3/2016 | Bonte | | |
| 2016/0298735 A1 * | 10/2016 | Maeda | ................... | F16H 61/04 |
| 2019/0338743 A1 * | 11/2019 | Gopalakrishnan | ......................... | F02N 11/0851 |
| 2023/0084503 A1 * | 3/2023 | Scharf | ................. | A01F 15/0825 56/341 |

FOREIGN PATENT DOCUMENTS

| | | | | | |
|---|---|---|---|---|---|
| DE | 102014013325 | A1 * | 3/2016 | ......... | A01F 15/0841 |
| DE | 102016216557 | B3 * | 12/2017 | ............ | B62M 11/06 |
| DE | 102018103765 | A1 * | 8/2019 | ............. | A01F 15/04 |
| EP | 0819375 | A1 | 1/1998 | | |
| EP | 2995192 | A1 | 3/2016 | | |
| EP | 3453250 | A1 | 3/2019 | | |
| EP | 3527064 | A1 | 8/2019 | | |
| EP | 3507182 | B1 * | 5/2021 | ............ | B62M 11/06 |
| EP | 4385311 | A1 * | 6/2024 | ............ | A01D 75/182 |
| EP | 4385312 | A1 * | 6/2024 | ............ | A01F 15/04 |
| EP | 4287818 | B1 * | 10/2024 | ............ | A01B 71/06 |
| WO | 2014170318 | A1 | 10/2014 | | |

\* cited by examiner

GEAR ASSEMBLY FOR DRIVING A RAM OF A SQUARE BALER

CROSS REFERENCE TO RELATED APPLICATION

This application claims priority under 35 U.S.C. § 119 to German Patent Application No. 10 2021 123 867.6 filed Sep. 15, 2021, the entire disclosure of which is hereby incorporated by reference herein. This application is related to U.S. application Ser. No. 17/945,182, incorporated by reference herein in its entirety.

TECHNICAL FIELD

The present invention relates to a gear assembly for driving a ram which is arranged or positioned in a pressing channel of a square baler such that it may move between end positions, and to a square baler having a drive train comprising such a gear assembly.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Square balers may be used in agriculture to pick up, for example, semi-mature harvested material such as straw, hay, grass or the like, which has been deposited in a swath, to shred it further, and to compress or press it into square bales. For this purpose, the square balers have various working units which serve for the required conveying and/or for further processing of the harvested material. Such working units are, for example, a cutting rotor for shredding the collected harvested material, a feed rake for pre-compacting and feeding the harvested material shredded by the cutting rotor into a pressing channel of the square baler, a ram which may be movably arranged or positioned in the pressing channel and presses the pre-compacted harvested material located in the pressing channel into a square bale, and a knotter which binds the pressed bale. These working units are typically drivingly connected with a central drive train of the square baler, which is connected to a power take-off shaft of an agricultural production machine, such as a tractor, when the square baler is in operation.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
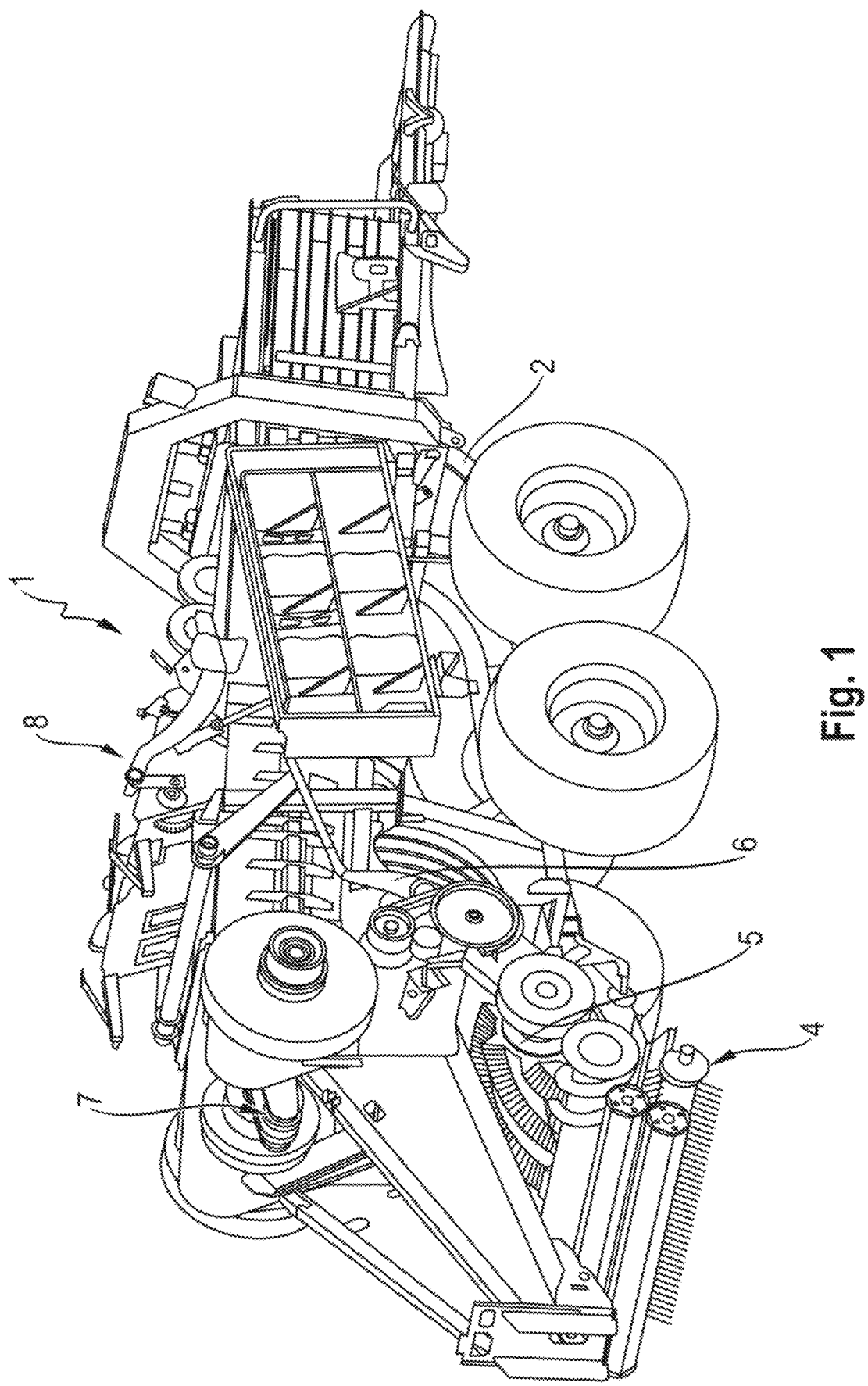
FIG. 1 shows a schematic and exemplary side view of a square baler.

As discussed in the background, square balers may conventionally comprise a flywheel, which serves as a damper and energy store between a drive unit of the agricultural production machine providing the drive output of the square baler and the working units of the square baler. See U.S. Pat. No. 9,814,185, incorporated by reference herein in its entirety. One may seek to develop increasingly powerful and larger square balers which compress harvested material that has been transferred to the pressing channel and pre-compressed into a square bale with a very high pressure. These efforts may lead to requiring ever-higher drive outputs be supplied to the ram using the drive train of the square baler, which in turn leads to requiring ever larger and heavier flywheels being installed in order to be able to provide the required drive outputs at all and to reduce any loads on the drive train of the square baler during operation.

However, the use of larger and heavier flywheels leads to an increase in the weight of the square baler, and a very high drive output is required to accelerate the flywheel from a standstill. At present, such flywheels are arranged or positioned on a drive shaft of the square baler, which is often designed as a cardan shaft and is connected to a torque input connection at which the drive output of the drive unit of the agricultural production machine is provided using a power take-off shaft. The drive shaft carrying the flywheel is mechanically connected to the working units of the square baler. Accordingly, when the square baler is started, the flywheel must always be accelerated from a standstill together with a majority of the drive train components and the working units of the square baler connected to the drive train. With some agricultural production machines, this leads to an undesired stalling of the drive unit of the agricultural production machine during start-up of the square baler due to the high inertia, and start-up of the square baler is not possible, or only possible with difficulty.

To solve this problem, WO 2014/170318 A1 discloses a square baler having a transmission device arranged or positioned on a cardan shaft between a torque input port and a flywheel, which is switchable between a starting state and an operating state. In the operating state, the transmission device transmits a rotary motion of a power take-off shaft of an agricultural production machine completely to the flywheel so that the transmission is comparable to a conventional axle. On the other hand, in the starting state, the transmission device transmits the rotary motion of the power take-off shaft to the flywheel only partially. As a result, the power take-off shaft may have a higher rotational speed than the flywheel. The transmission device is designed as a planetary gear or as a friction clutch. Due to the transmission device, a flywheel may be used in the square baler that is too heavy and/or too large to be put into operation via a direct connection.

A disadvantage of this solution is that the use of an additional transmission means increases the complexity of the drive train and, consequently, the costs of the square baler, since an additional assembly must be connected upstream from the flywheel. Moreover, the use of the transmission means increases the weight of the drive train and, consequently, the weight of the square baler, which may be considered disadvantageous with regard to efficiency of the square baler or of agricultural train comprising (or consisting of) an agricultural production machine and a square baler, in operation and with respect to the load on the ground.

Furthermore, despite the use of a transmission device upstream from the flywheel, the flywheel must be accelerated together with the downstream drive train components and the working units connected to the drive train so that there is still at least a certain residual risk with regard to stalling the drive unit of the agricultural production machine during start-up of the square baler. Moreover, it is still necessary to use an extremely large and heavy flywheel in order to be able to provide the drive output of more powerful and larger square balers, such as the drive output of such square balers required to operate the ram.

Accordingly, a gear assembly is disclosed that is configured to drive a ram arranged or positioned in a pressing channel of a square baler so as to be movable between end positions, with the gear assembly allowing a flywheel to be accelerated from standstill apart from the ram, while at the same time providing (such as always providing) the high drive output at the ram required in operation and reducing the weight of the drive train.

Accordingly, in one or some embodiments, a gear assembly is disclosed for driving a ram arranged or positioned in a pressing channel of a square baler so as to be movable between end positions. The gear assembly comprises at least one side gear indirectly drivable by a power take-off shaft of an agricultural production machine, such as a tractor, and at least one reduction gear connected downstream of the at least one side gear. The at least one reduction gear may be connectable on the output side to a crankshaft on which the ram is mounted. The gear assembly may comprise at least one flywheel that is connected between the at least one side gear and the at least one reduction gear, and/or at least one shiftable clutch device that is connected between the at least one flywheel and the at least one reduction gear.

By arranging at least one flywheel between the at least one side gear and the at least one reduction gear in combination with a shiftable clutch device connected downstream of the at least one flywheel and upstream from the at least one reduction gear, it is possible, when starting up the square baler, first to accelerate the flywheel from a standstill and then to engage the ram and the at least one reduction gear associated with the ram. In this way, due to the inertia of the drive train components, a load acting on the drive unit of the agricultural production machine may be reduced by a considerable extent since only the at least one flywheel and the drive train components connected upstream thereof have to be accelerated from a standstill, but the ram and the at least one reduction gear associated therewith do not yet have to be driven. The probability of stalling of the drive unit of the agricultural production machine may thus be reduced without having to connect a clutch device upstream from the flywheel.

Furthermore, due to the arrangement of the flywheel downstream from the at least one side gear, the flywheel may be dimensioned substantially smaller so that the inertia generated by the flywheel is reduced. This may also ensure that the load acting on the drive unit of the agricultural production machine may be further reduced when the square baler is put into operation. The at least one side gear may be driven using an output shaft of an upstream power split, which in turn may be connected to the torque input connector using a further input shaft.

Accordingly, in one or some embodiments, the gear assembly may reduce the probability of the drive unit of the agricultural production machine stalling, irrespective of the drive output which may be provided at all using the drive unit. At the same time, the weight of the entire drive train and the complexity of the structure of the drive train may be reduced considerably, resulting in increased efficiency and reliability of the square baler. Notwithstanding the aforementioned advantages, using the disclosed gear assembly, regardless of the specific power requirement of the ram, the necessary drive output for the operation of the ram may be provided.

In one or some embodiments the at least one shiftable clutch device may be arranged or positioned (such as directly arranged or directly positioned) between the at least one flywheel and a gear input of the at least one reduction gear. This may create a short path for transmitting power to the ram, since only the at least one shiftable clutch device and the at least one reduction gear are arranged or positioned between the ram and the flywheel. The drive output generated with the aid of the flywheel may be transmitted almost without loss and very directly to the reduction gear, which may convert the drive output in such a way that a high torque required for the operation of the ram is achieved at low speed.

In one or some embodiments an actuation of the at least one shiftable clutch device may be controlled, such as automatically controlled, using a control device. By way of example, when the square baler is started up or operation is initiated, the at least one shiftable clutch device may be in a disengaged state (e.g., the at least one shiftable clutch device may be in a disengaged state after operation is initiated an prior to the control device sending command(s)), in which the at least one flywheel and the at least one reduction gear are decoupled from one another. As soon as the at least one flywheel has reached a predetermined speed (e.g., a nominal rotational speed) or a rotational speed which is below the predetermined speed (e.g., a nominal rotational speed), such as a rotational speed which is up to 70% below the nominal rotational speed, are in an engaged state in which the at least one flywheel and the at least one reduction gear are operatively connected to one another. For example, the control device may monitor the speed of the at least one flywheel to determine whether the at least one flywheel has reached (or exceeded) the predetermined speed or the rotational speed is below the predetermined speed. Responsive to the control device determining that the at least one flywheel has reached (or exceeded) the predetermined speed or the rotational speed is below the predetermined speed, the control device may send one or more commands in order for the square baler to exit the disengaged state and/or to enter the engaged state (such as to exit the disengaged state and to enter the engaged state). In one or some embodiments, the control device may automatically determine that the at least one flywheel has reached (or exceeded) the predetermined speed or the rotational speed is below the predetermined speed, and may automatically send one or more commands in order for the square baler to exit the disengaged state and/or to enter the engaged state (e.g., configured to automatically transition between states).

This may make it possible to switch on the ram and the at least one reduction gear fully automatically as soon as the at least one flywheel has reached the nominal rotational speed or a rotational speed below the nominal rotational speed. A user of the square baler or the agricultural production machine only need indicate to the control device that it is intended to start the square baler. The control device may then automatically assume total control of the switching of the at least one clutch device so that it is ensured that faulty operation or premature switching on of the piston cannot take place.

In one or some embodiments, the at least one shiftable clutch device is a hydraulically operable clutch device, such as a hydraulically operable multi-plate clutch. On the one hand, this may ensure that a sufficiently high pressure is generated in the at least one shiftable clutch device so that the drive output may be reliably transmitted to the at least one reduction gear without generating large losses in the process. On the other hand, the hydraulic actuation may be used to achieve variable control of the shiftable clutch device so that it may initially be operated in slip mode for a certain time during the shifting process for coupling the ram, for example (e.g., the control device may be configured to control the hydraulic actuation).

In particular, it is contemplated in this context that the control device generates switching signals for the components of a hydraulic circuit, for example a hydraulic pump, a switching valve, etc., so that a volume flow for actuating the at least one switchable clutch device may be variably set.

In one or some embodiments, the at least one flywheel forms a component of an output of the at least one side gear. In this context, the at least one flywheel may be integrally formed with the output of the at least one side gear. Alternatively, the at least one flywheel may be connected to the output of the at least one side gear in any one, any combination, or all of a form-fit; a force-fit; or a material bond. This embodiment may also ensure, on the one hand, a very direct drive of the at least one flywheel and, on the other hand, a compact design of the gear assembly since the installation space of the output of the at least one side gear may be used simultaneously for the at least one flywheel.

In one or some embodiments, the output of the at least one side gear is rotatably mounted on a housing of the at least one reduction gear. This may also make it much easier to have a compact installation space of the gear assembly since an installation space required for the arrangement of the at least one reduction gear may simultaneously be used for the arrangement of the output of the at least one side gear, the at least one flywheel and also the at least one shiftable clutch device. Additional components, such as shafts and bearing components therefor, for connecting the individual aforementioned components to one another may be dispensed with, which may further reduce the weight of the drive train. The installation space saved by the compact arrangement of all the aforementioned components of the gear assembly may be used profitably for the arrangement and drive of other components and/or working units of the square baler.

In one or some embodiments, the at least one side gear is a traction gear, such as a V-belt gear. The use of at least one traction gear may make it possible to compensate, such as in a particularly advantageous manner, for possible torsion in the drive train which results from a load acting on the drive train through the ram. At the same time, a drive output provided to the at least one traction gear using the power split may already be (pre-)converted with regard to the arrangement and the concrete embodiment of the at least one flywheel and the ram, whereby a spatial distance between the power split and the ram drive may be bridged in a particularly uncomplicated manner.

In one or some embodiments, the at least one reduction gear is a multi-stage gear, wherein a gear ratio in each gear stage is i>1. The multi-stage design of the at least one reduction gear with a gear ratio of i>1 in each stage may serve to convert the drive output supplied to the reduction gear using the at least one side gear into the drive output required for operating the ram, which may be characterized by a very high torque at a very low speed. The torque required for operating the ram is, for example, a factor of at least 10 times higher, at least 20 times higher, at least 30 times higher, or approximately 40 to 50 times higher than the torque provided at the torque input connection using the drive unit, and the rotational speed required for operating the ram is, for example, a factor of at least 10 times lower or approximately 20 times lower than the rotational speed provided at the torque input connection using the drive unit.

In one or some embodiments, the at least one reduction gear is a planetary gear. In one or some embodiments, the at least one reduction gear is a two-stage planetary gear, wherein the two-stage planetary gear may be designed in each of the two gear stages to be driven via a sun gear and to output via a bar on which planetary gears are mounted, wherein a bar of the second stage is connectable to the crankshaft.

The use of a two-stage planetary gear as the at least one reduction gear may ensure on the one hand the previously described conversion of the drive output to the drive output required for the operation of the ram. At the same time, however, the planetary gear may be characterized by a very compact installation space and may ensure a reduced weight compared to other types of gear which would be suitable for such a reduction of the drive output. Another advantage of using a planetary gear is that the high drive output to be transmitted may not only be transmitted via a tooth, as would be the case with spur gears, for example, but always via a tooth of a planetary gear. This may considerably reduce the load on the components of the reduction gear, so that the service life and reliability of the reduction gear and the gear assembly may be increased as a whole.

As an alternative to the embodiment as a planetary gear, however, it is also contemplated to design the at least one reduction gear as a multi-stage spur gear.

In one or some embodiments, the at least one reduction gear comprises a power split for driving further working units of the square baler, wherein the power split may comprise a multi-stage spur gear.

If the at least one reduction gear is designed as a two-stage planetary gear, it is provided in accordance with a further advantageous development of the invention that a gear input, such as a toothed wheel forming the gear input, of the power split designed as a multi-stage spur gear may be operatively connected to the bar of the first gear stage of the reduction gear designed as a two-stage planetary gear.

The assignment of the power split to the at least one reduction gear described above may allow further working units to be driven in parallel with the ram. In particular, this may in turn promote effective utilization of the installation space of the gear assembly since the installation space required by the at least one reduction gear may also be used at least proportionally for the power split. Furthermore, due to the operative connection of the power split with a specific gear stage of the at least one reduction gear, the power split may be effectuated starting from a drive output, which may be advantageous with regard to the drive output required for operation of the further working units.

In one or some embodiments, the gear assembly comprises two side gears, two reduction gears, two flywheels and two shiftable clutch devices, wherein at least one (or each) reduction gear may always be connected downstream from one side gear, wherein at least one (or each) flywheel may always be connected between one side gear and one reduction gear, and wherein at least one (or each) shiftable clutch device may always be connected between a flywheel and the at least one reduction gear. Further, there may be a plurality of reduction gears, with each reduction gear of the plurality of reduction gears being connected to the crankshaft on the output side.

This may produce a gear assembly which may be particularly suitable for especially high output at the ram. By using two assemblies in each case, a symmetrical drive of the crankshaft bearing the ram may be achieved, wherein each side of the gear assembly may experience a reduced load. Starting from the power split, which may be connected upstream from the side gears, the drive output may be distributed and supplied proportionally to the crankshaft via a right and left strand of the gear assembly. There, the power components may then be recombined with each other so that the drive output required for the operation of the ram may be provided. Also, this embodiment may still be characterized by relatively low weight and complexity. Furthermore, by using two flywheels, this embodiment may allow a further reduction in the dimensioning of each flywheel, which has an advantageous effect on starting the square baler, its weight and efficiency in operation.

In one or some embodiments, a square baler is disclosed with a drive train comprising such a gear assembly described above.

Referring to the figures, FIG. 1 shows a schematic and exemplary representation of an embodiment of the square baler 1. The square baler 1 may be coupled to an agricultural production machine not shown in the figures, such as a tractor, so that the square baler 1 and the agricultural production machine jointly form a so-called agricultural train. The square baler 1 may comprise a housing, not shown in FIG. 1, which surrounds the components of the square baler 1 attached to a chassis 2 of the square baler 1.

Figure 2:
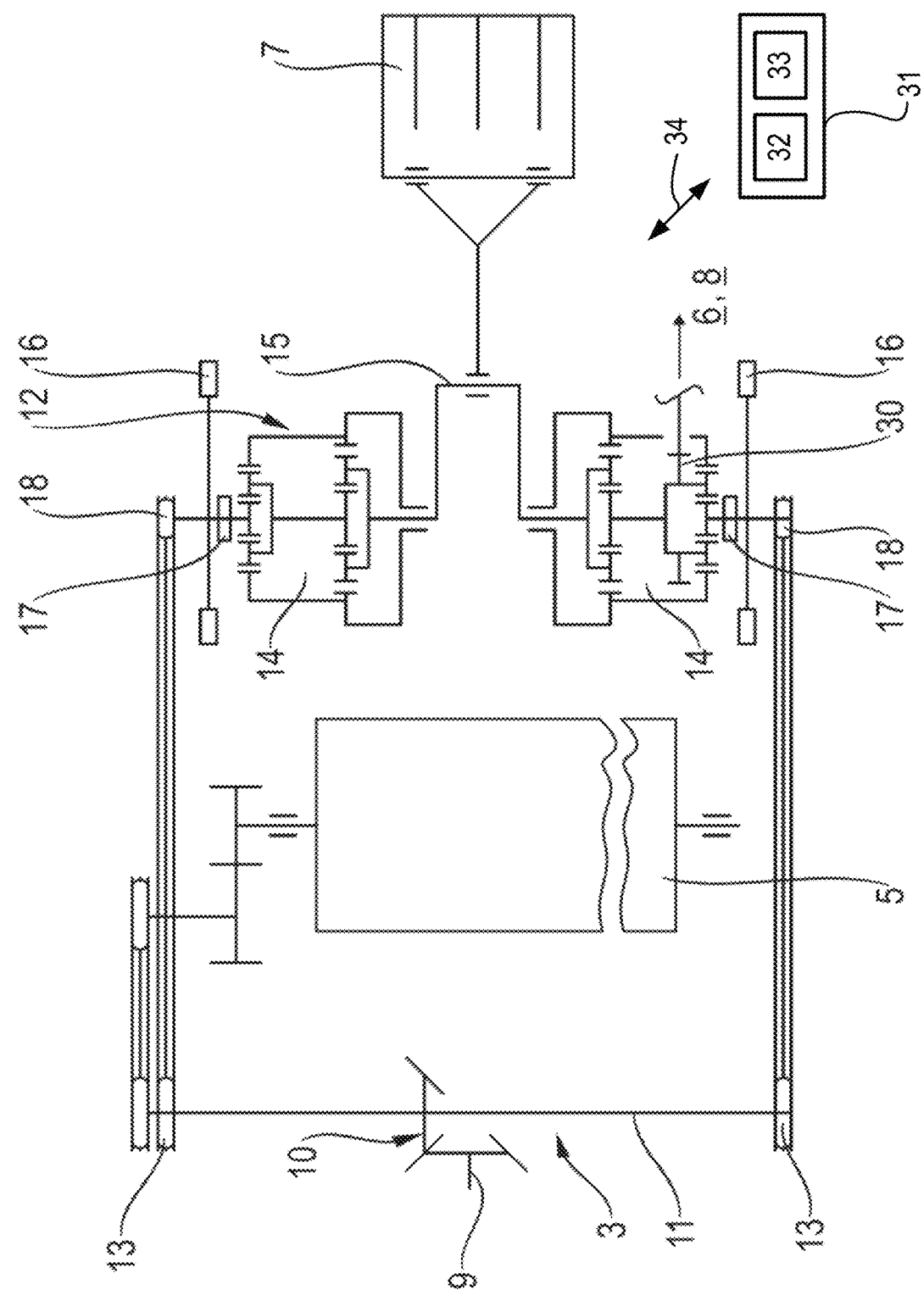
FIG. 2 shows a schematic and exemplary representation of a drive train of the square baler comprising the gear assembly according to the invention.

The square baler 1 may further comprise a drive train 3 shown in more detail in FIG. 2, through which various working units of the square baler 1 are driven. Such working units are, for example, any one, any combination, or all of: a pick-up device 4 known as a pick-up for picking up harvested material deposited in a swath on an agricultural area; a cutting rotor 5 for shredding the picked-up harvested material; a feed rake 6 for pre-compressing the shredded harvested material and feeding it into a pressing channel of the square baler 1; a ram 7 movably arranged or positioned between end positions in the pressing channel of the square baler 1 for pressing the pre-compressed crop into a square bale; and a knotter 8 for binding the pressed square bale.

The drive train 3 of the square baler 1 may be supplied with a drive output using the agricultural production machine, such as the tractor. For this purpose, at the rear, the agricultural production machine may comprise a power take-off known to one of skill in the art. The drive train 3 of the square baler 1 may comprise a drive shaft 9 which, in turn, may comprise a torque input connection of the drive train 3, through which the drive train 3 of the square baler 1 may be connected to the power take-off of the agricultural production machine.

In one or some embodiments, a first power split 10, which may be formed as a bevel gear stage, is connected to the drive shaft 9 of the drive train 3. One bevel gear of the first power branch, which may be formed as a bevel gear stage, comprises an output shaft 11 which extends transversely to the drive shaft 9 (e.g., transversely to the main extension direction of the square baler 1 (e.g., transversely to a longitudinal direction of the square baler 1)), to which the other bevel gear of the bevel gear stage may be connected.

Figure 3:
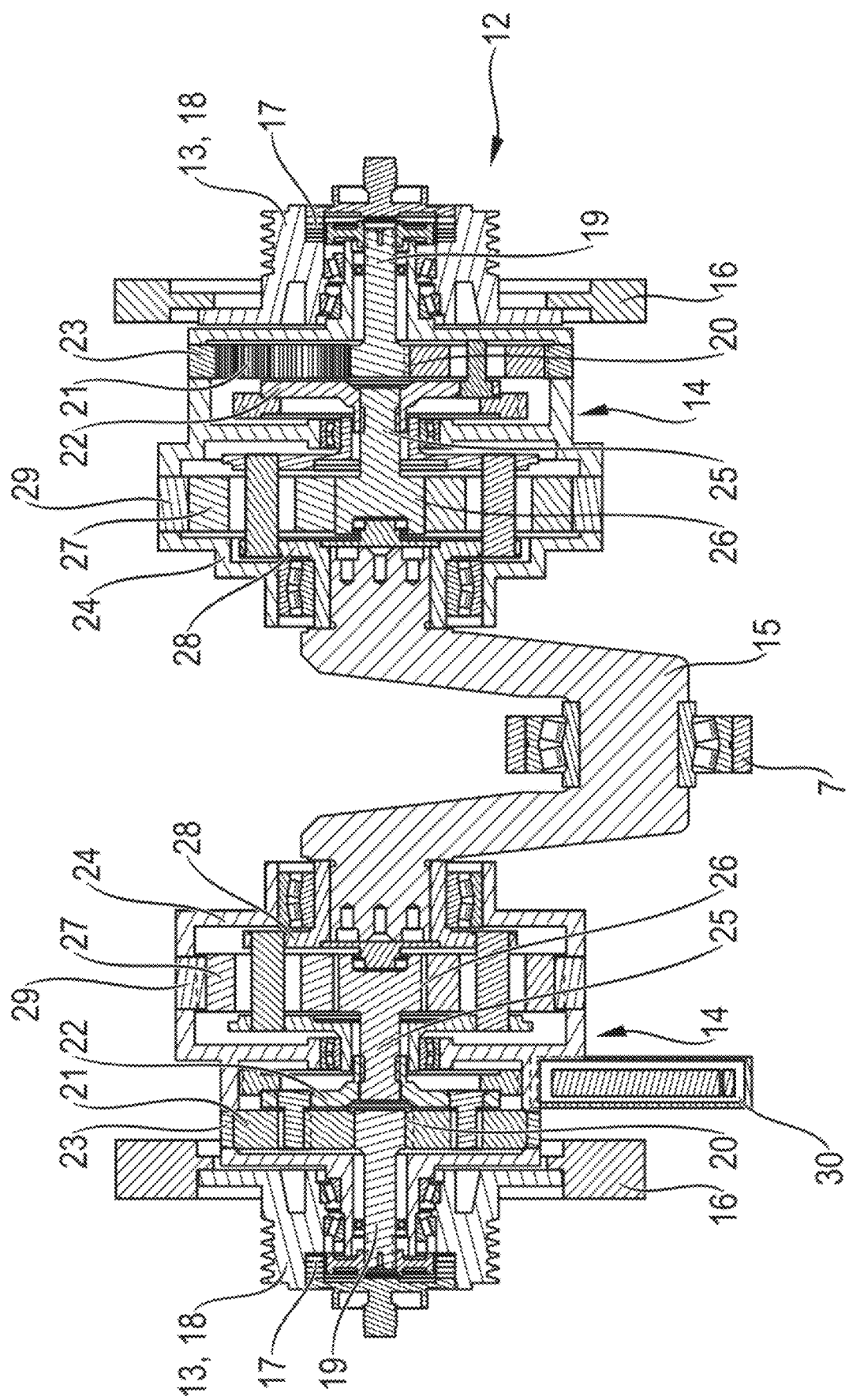
FIG. 3 shows a schematic and exemplary partial sectional view of an embodiment of the gear assembly.

In one or some embodiments, the square baler 1 and the drive train 3 of the square baler 1 comprises, in addition to the aforementioned drive train components, a gear assembly 12. As shown in FIGS. 2 and 3, the gear assembly 12 may comprise at least one side gear 13, which may be drivable (such as indirectly drivable) by a power take-off shaft of the agricultural production machine. In this context, "indirectly" may mean that the at least one side gear 13 may be connected to the power split 10. As shown in FIG. 2, a drive of the at least one side gear 13 may be arranged or positioned on the output shaft 11 of the power split 10. A drive output provided to the at least one side gear 13 using the power split 10 may be converted using the at least one side gear 13, but may also be transmitted without conversion.

In one or some embodiments, the at least one side gear 13 may be formed as a traction gear, such as a V-belt gear, which, as stated at the outset, may be considered advantageous with respect to the design of the gear assembly 12. However, the at least one side gear 13 may also be formed as another traction gear, for example a chain gear, or a bevel gear stage. The use of a traction gear as the at least one side gear 13 makes it particularly uncomplicated to bridge a spatial distance between the power split 10 and the ram 7.

Downstream from the at least one side gear 13, there may be at least one reduction gear 14 which may be configured to convert the drive output provided using the at least one side gear 13 into drive output required for the operation of the ram 7. The at least one reduction gear 14 may be connectable or may be connected at the output side to a crankshaft 15 on which the ram 7 is mounted.

In one or some embodiments, at least one flywheel 16 may be interposed between the at least one reduction gear 14 and the at least one side gear 13, and at least one shiftable clutch device 17 may, in turn, be interposed between the at least one flywheel 16 and the at least one reduction gear 14. In one or some embodiments, the at least one shiftable clutch device 17 is arranged or positioned directly between the at least one flywheel 16 and a gear input of the at least one reduction gear 14.

The actuation of the at least one shiftable clutch device 17 is controllable using a control device 31 (shown in FIG. 2). The control device 31 may be associated with the square baler 1 itself and/or also with the agricultural production machine. In one or some embodiments, the control device 31 is configured to control the actuation of the at least one shiftable clutch device 17 in such a way that, when the square baler 1 is started up, the clutch device 17 is in a disengaged state. In one or some embodiments, a disengaged state of the clutch device 17 is a state in which the at least one flywheel 16 is decoupled from the at least one reduction gear 14, and therefore no drive output may be transmitted from the at least one flywheel 16 or the component bearing the at least one flywheel 16, such as the at least one side gear 13, to the gear input of the at least one reduction gear 14. In this switched state of the at least one shiftable clutch device 17, the at least one flywheel 16 may be accelerated from a standstill by means of the drive output provided by the at least one side gear 13. As soon as the at least one flywheel 16 has reached its nominal rotational speed or a speed which is below the nominal rotational speed, such as a speed which is up to 70% below the nominal rotational speed (the value 70% below the nominal rotational speed may be included in this range), the control device may control the actuation of the at least one shiftable clutch device 17 (e.g., by sending one or more commands to the at least one shiftable clutch device) in such a way that the at least one shiftable clutch device 17 is transferred into a engaged state. In one or some embodiments, an engaged state is a state in which the at least one flywheel 16 is coupled to the at least one reduction gear 14, and therefore a driving power may be transmitted from the at least one flywheel 16 or the component bearing the at least one flywheel 16, such as the at least one side gear 13, to the gear input of the at least one reduction gear 14.

Various types of control devices 31 are contemplated. In one example, the control device 31 may include any type of computing functionality, such as at least one processor 32 (which may comprise a microprocessor, controller, PLA, or the like) and at least one memory 33. The memory 33 may comprise any type of storage device (e.g., any type of memory). Though the processor 32 and the memory 33 are depicted as separate elements, they may be part of a single machine, which includes a microprocessor (or other type of controller) and a memory. Alternatively, the processor 32 may rely on memory 33 for all of its memory needs.

The processor 32 and memory 33 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Further, the functionality discussed herein, such as the determination of the speeds (e.g., comparison of the speed of the at least one flywheel 16 with one or more predetermined speeds), the determination of the control (e.g., responsive to determining that the speed meets, exceeds or is less than the one or more predetermined speeds, determining to control at least a part of the square baler 1), or the actuation of the control (e.g., sending commands to control one or more parts of the square baler 1, such as the at least one flywheel 16), may be performed by the computing functionality. In practice, the control device 31 may send the one or more commands via wired or wireless communication, as indicated by arrow 34.

According to one embodiment of the gear assembly 12, the at least one shiftable clutch device 17 may be designed as a hydraulically actuatable or shiftable clutch device 17, such as a hydraulically actuatable or shiftable multi-plate clutch. In this context, it is contemplated that the control device 31 is configured to generate switching signal(s), which are examples of command(s), for the components of a hydraulic circuit connected to the at least one hydraulically actuatable or shiftable clutch device 17, for example a hydraulic pump, a shift valve, etc., so that a volume flow for actuating the at least one hydraulically actuatable or shiftable clutch device 17 is variably adjustable using the control signals to the components.

In principle, it is also contemplated that the actuation of the at least one shiftable clutch device 17 may also be performed manually by a user, for example by actuating a foot pedal in a passenger compartment of the agricultural production machine.

According to one embodiment of the gear assembly 12, the at least one flywheel 16 may be designed as a component of an output 18 of the at least one side gear 13. According to one embodiment, the at least one flywheel 16 may be integrally formed with the output 18 of the at least one side gear 13 such that the output 18 and flywheel 16 form a coherent component. Alternatively, the at least one flywheel 16 may be connected in any one, any combination, or all of a force fit, a form fit, or a material bond with the output 18 of the at least one side gear 13.

As shown in FIGS. 2 and 3, the at least one reduction gear 14 may be configured as a multi-stage reduction gear 14. Each gear stage of the at least one multi-stage reduction gear 14 has a gear ratio of i>1.

According to an embodiment illustrated in FIG. 3, the at least one reduction gear 14 is formed as a planetary gear. In one or some embodiments, the planetary gear is designed as a two-stage planetary gear, which may be connectable or connected on the input side using the at least one shiftable clutch device 17 to the at least one flywheel 16, or the output 18 comprising the at least one flywheel 16, of the at least one side gear 13 in such a way that a drive output may be or is supplied to the planetary gear. On the output side, the two-stage planetary gear may be connectable or connected to the crankshaft 15. The gear input of the two-stage planetary gear may comprise a first gear shaft 19 on which a first sun gear 20 is mounted. The first sun gear 20 may mesh with a plurality of first planetary gears 21, such as four first planetary gears 21, which may be jointly rotatably mounted on a first bar 22. The first planetary gears 21 in turn may mesh with a first ring gear 23 which may be rigidly connected to a gear housing 24 that in turn may be connected to the chassis 2 of the square baler 1 or to another component of the square baler 1 so that, during operation of the square baler, the gear housing 24 moves only together with the square baler 1, but not relative to the square baler 1 (oscillatory movements are excluded here). Accordingly, in the engaged state of the at least one shiftable clutch device 17, the drive power may be supplied to the first sun gear 20 via the first gear shaft 19 and is transmitted to the first planetary gears 21 which may run off the first ring gear 23 and transmit a rotary motion to the first bar 22. Thus, the output may occur in the first gear stage of the two-stage planetary gearbox via the first bar 22. The first bar 22 of the first gear stage may be connected to a second gear shaft 25 in such a way that the drive power is transmitted from the first bar 22 to the second gear shaft 25 when the at least one shiftable clutch device 17 is in an engaged state. A second sun gear 26 may be mounted on the second gear shaft 25. The second sun gear 26 may mesh with a plurality of second planetary gears 27, such as four second planetary gears 27, which may be jointly rotatably mounted on a second bar 28. The second planetary gears 27 in turn may mesh with a second ring gear 29, which may be rigidly connected to the gear housing 24. Accordingly, when the at least one shiftable clutch device 17 is in the engaged state, the drive power may be supplied, starting from the first gear stage, to the second sun gear 26 via the second gear shaft 25 and may be transmitted to the second planetary gears 27 which may run off the second ring gear 29 and transmit a rotary motion to the second bar 28. The output thus may take place in the second gear stage of the two-stage planetary gear via the second bar 28, which may be connected or is connected to the crankshaft 15, and therefore when the at least one shiftable clutch device 17 is in the engaged state, may transmit the drive power to the crankshaft 15 and the ram 7 mounted thereon.

As an alternative to the previously described embodiment of the at least one reduction gear 14 as a two-stage planetary gear, an embodiment as a single-stage planetary gear or as a planetary gear with three or more stages is also contemplated. A further alternative embodiment of the at least one reduction gear 14 is a multi-stage spur gear.

It may further be provided that the output 18 of the at least one side gear 13, which may comprise the at least one flywheel 16, is rotatably mounted on the gear housing 24.

Such an embodiment is shown in FIG. 3, but is not limited to an embodiment of the at least one reduction gear 14 as a planetary gear.

As shown in FIGS. 2 to 3, the gear assembly 12 may comprise two side gears 13, two reduction gears 14, two flywheels 16 and two shiftable clutches 17. As already described at the outset, the embodiment may be regarded as particularly advantageous with respect to square balers 1 which may require a particularly high drive output at the ram 7. However, such an embodiment may also be equally suitable for square balers 1 which require a lower drive output at the ram 7.

In such an embodiment of the gear assembly 12 with two assemblies in each case, a reduction gear 14 may always be connected downstream from a side gear 13, a flywheel 16 may always be connected downstream from a side gear 13 and a reduction gear 14, and a shiftable clutch device 17 may always be connected between a flywheel 16 and a reduction gear 14. Each of the reduction gears 14 may be connectable or connected to the crankshaft 15 on the output side, so that the crankshaft 15 may be arranged or positioned between the two reduction gears 14. In each case, drive power may always be supplied to one of the reduction gears 14 from one of the two side gears 13, with the interposition of a flywheel 16 and a shiftable clutch device 17, via the particular output 18 of the side gear 13, which power may then be converted in the particular reduction gear 14 and may be transmitted to the crankshaft 15 on which the ram 7 is mounted.

In other words, in one or some embodiments, starting from the power split 10 upstream from each of the two side gears 13, the driving power may be distributed and supplied proportionally to the crankshaft 15 via a right and left strand of the gear assembly 12. At the crankshaft 15, the power components may then be recombined with each other so that the drive output required for the operation of the ram 7 may be provided.

Even though FIGS. 2 to 3 illustrate the previously described embodiment of the gear assembly 12 with two assemblies 13, 14, 16, 17 in each case, an embodiment of the gear assembly 12 with only one such assembly 13, 14, 16, 17 in each case is equally possible or desirable depending on the drive output required at the ram 7. In such a case, the gear assembly 12 may be formed only on one side of the crankshaft 15, wherein the reduction gear 14 is connected on the output side to one end of the crankshaft 15, and the crankshaft 15 is mounted by its other end so as to be rotatably movable in the housing of the square baler 1.

In one or some embodiments, the gear assembly 12 may further comprise a power split 30 associated with the at least one reduction gear 14. The power split 30 may comprise a multi-stage spur gear. This makes it possible to drive further working units, such as a feed rake 6 and/or a knotter 8, in parallel with the press ram 7. If the at least one reduction gear 14 is designed as a two-stage planetary gear, the power split 10, such as a gearwheel of the spur gear, may operatively be connected to the first bar 22 of the first gear stage.

In one or some embodiments, the drive train 3 of the square baler 1 may further be controlled, starting from the power split 10 or the output shaft 11 of the power split 10, to drive at least one further working unit, for example a pick-up device 4 and/or a cutting rotor 5. For this purpose, at least one further side gear or at least one angular gear may be connected downstream from the power split 10 or the output shaft 11 of the power split 10 (alternatively termed power branch) and transmit the drive output directly or indirectly, for example via one or more gears, to the further working units 4, 5 of the square baler 1.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Square baler
2 Chassis
3 Drivetrain
4 Pick-up device
5 Cutting rotor
6 Feed rake
7 Ram
8 Knotter
9 Drive shaft
10 Power split (power split before the gear assembly)
11 Output shaft
12 Gear assembly
13 Side gear
14 Reduction gear
15 Crankshaft
16 Flywheel
17 Shiftable clutch device
18 Output of the side gear
19 Gear shaft of the first stage of the planetary gear (first gear shaft)
20 Sun gear of the first stage of the planetary gear (first sun gear)
21 Planetary gears of the first stage of the planetary gear (first planetary gears)
22 Bar of the first stage of the planetary gear (first bar)
23 Ring gear of the first stage of the planetary gear (first ring gear)
24 Gear housing
25 Gear shaft of the second stage of the planetary gear (second gear shaft)
26 Sun gear of the second stage of the planetary gear (second sun gear)
27 Planetary gears of the second stage of the planetary gear (second planetary gears)
28 Bar of the second stage of the planetary gear (second bar)
29 Ring gear of the second stage of the planetary gear (second ring gear)
30 Power split (power split at the reduction gear)
31 Control device
32 Processor
33 Memory
34 Communication

The invention claimed is:

1. A gear assembly configured to drive a ram arranged in a pressing channel of a square baler so that the ram is configured to move between end positions, the gear assembly comprising:

at least one side gear indirectly drivable by a power take-off shaft of an agricultural production machine;

at least one reduction gear connected downstream from the at least one side gear, the at least one reduction gear configured, on an output side, to connect to a crankshaft on which the ram is mounted;

at least one flywheel connected between the at least one side gear and the at least one reduction gear; and at least one shiftable clutch device connected between the at least one flywheel and the at least one reduction gear.

2. The gear assembly of claim 1, wherein the agricultural production machine comprises a tractor; and wherein the at least one shiftable clutch device is positioned directly between the at least one flywheel and a gear input of the at least one reduction gear.

3. The gear assembly of claim 1, further comprising a control device configured to control actuation of the at least one shiftable clutch device by:

responsive to starting up the square baler, the control device sending a command to transition from a disengaged state, in which the at least one flywheel and the at least one reduction gear are decoupled from one another, to an engaged state, in which the at least one flywheel and the at least one reduction gear are operatively connected to one another.

4. The gear assembly of claim 3, wherein the control device is configured to automatically transition from the disengaged state to the engaged state by:

determining whether a rotational speed of the at least one flywheel is at least a predetermined speed; and responsive to determining that the rotational speed of the at least one flywheel is at least the predetermined speed, automatically sending one or more commands to transition to the engaged state.

5. The gear assembly of claim 1, wherein the at least one shiftable clutch device comprises a hydraulically operable multi-plate clutch.

6. The gear assembly of claim 1, wherein the at least one flywheel is designed as a component of an output of the at least one side gear.

7. The gear assembly of claim 6, wherein the at least one flywheel is formed integrally with the output of the at least one side gear; or wherein the at least one flywheel is connected in one or more of a force fit, form fit, or a material bond with the output of the at least one side gear.

8. The gear assembly of claim 6, wherein the output of the at least one side gear is rotatably mounted on a housing of the at least one reduction gear.

9. The gear assembly of claim 1, wherein the at least one side gear comprises a V-belt gear.

10. The gear assembly of claim 1, wherein the at least one reduction gear is a multi-stage gear; and wherein a gear ratio in each gear stage is i>1.

11. The gear assembly of claim 10, wherein the at least one reduction gear comprises a two-stage planetary gear including a first stage and a second stage;

wherein the two-stage planetary gear is configured in each stage to be driven via a sun gear and to output via a bar on which planetary gears are mounted; and wherein the bar of the second stage is configured to be connectable to the crankshaft.

12. The gear assembly of claim 10, wherein the at least one reduction gear is a multi-stage spur gear.

13. The gear assembly of claim 1, wherein the at least one reduction gear comprises a power split configured to drive a plurality of working units of the square baler.

14. The gear assembly of claim 13, wherein the power split comprises a multi-stage spur gear.

15. The gear assembly of claim 14, wherein the at least one reduction gear comprises a two-stage planetary gear;

wherein a gear input of the power split designed as a multi-stage spur gear is operatively connected to a bar of a first gear stage of the at least one reduction gear; and wherein a toothed wheel forms the gear input.

16. The gear assembly of claim 1, wherein the gear assembly comprises two side gears, two reduction gears, two flywheels and two shiftable clutch devices;

wherein the at least one reduction gear is always connected downstream from at least one of the two side gears;

wherein at least one of the two flywheels is always connected between the at least one of the two side gears and the at least one reduction gear; and wherein at least one of the two shiftable clutch devices is always connected between one flywheel and the at least one reduction gear.

17. The gear assembly of claim 16, wherein the at least one reduction gear comprises a plurality of reduction gears; and wherein each of the plurality of reduction gears is configured to connect to the crankshaft on the output side.

18. The gear assembly of claim 13, wherein a drive of the at least one side gear is positioned on an output shaft of the power split.

19. A square baler comprising:

a drive train configured to drive at least a ram arranged movably between end positions in a pressing channel of the square baler; and a gear assembly comprising:

at least one side gear indirectly drivable by a power take-off shaft of an agricultural production machine;

at least one reduction gear connected downstream from the at least one side gear, the at least one reduction gear configured, on an output side, to connect to a crankshaft on which the ram is mounted;

at least one flywheel connected between the at least one side gear and the at least one reduction gear; and at least one shiftable clutch device connected between the at least one flywheel and the at least one reduction gear.

20. The square baler of claim 19, further comprising a control device configured to control actuation of the at least one shiftable clutch device by:

responsive to starting up the square baler, the control device sending a command to transition from a disengaged state, in which the at least one flywheel and the at least one reduction gear are decoupled from one another, to an engaged state, in which the at least one flywheel and the at least one reduction gear are operatively connected to one another.

* * * * *